United States Patent
Mense et al.

(10) Patent No.: US 6,206,467 B1
(45) Date of Patent: Mar. 27, 2001

(54) UPHOLSTERED ELEMENT FASTENED TO A COVER BY MEANS OF A HOOK AND LOOP STRIP

(75) Inventors: Hubert Mense, Prichsenstadt; Charlotte Leckert, Würzburg, both of (DE)

(73) Assignee: F.S. Fehrer GmbH & Co. KG (DE)

( * ) Notice: Subject to any disclaimer, the term of this patent is extended or adjusted under 35 U.S.C. 154(b) by 0 days.

(21) Appl. No.: 09/269,612

(22) PCT Filed: Jun. 12, 1997

(86) PCT No.: PCT/DE97/01227

§ 371 Date: Mar. 25, 1999

§ 102(e) Date: Mar. 25, 1999

(87) PCT Pub. No.: WO98/22307

PCT Pub. Date: May 28, 1998

(30) Foreign Application Priority Data

Nov. 20, 1996 (DE) ............................................. 196 48 089

(51) Int. Cl.[7] .............................. B60N 2/44; A47C 31/02
(52) U.S. Cl. ..................... 297/218.2; 297/452.6; 297/DIG. 6
(58) Field of Search ............................. 297/218.2, 218.3, 297/218.5, 219.1, 228.13, 452.6, DIG. 6; 24/306, 442

(56) References Cited

U.S. PATENT DOCUMENTS

| | | |
|---|---|---|
| 4,470,857 | 9/1984 | Casalou . |
| 4,609,226 * | 9/1986 | Yoshizawa ........................ 297/452.6 |
| 4,679,851 * | 7/1987 | Solie et al. ................. 297/DIG. 6 X |
| 4,776,636 * | 10/1988 | Pyle et al. .................. 297/DIG. 6 X |
| 4,933,224 * | 6/1990 | Hatch .................. 24/306 X |
| 5,236,243 * | 8/1993 | Reyes ................. 297/219.1 |

FOREIGN PATENT DOCUMENTS

| | | |
|---|---|---|
| 0 045 379 A1 | 2/1982 | (EP) . |
| 231692 * | 8/1987 | (EP) ................. 297/228.13 |
| 0 773 095 A2 | 5/1997 | (EP) . |

* cited by examiner

Primary Examiner—Peter R. Brown
(74) Attorney, Agent, or Firm—McGlew and Tuttle, P.C.

(57) ABSTRACT

An upholstery element is disclosed which has a flexible core and a cover. The core and the cover are fastened to one another by a hook-fastener connection. The connection includes a hook strip having a plurality of hooks overlaid by a fleece strip having a plurality of elements, behind which the hooks engage. The strips are fastened one to the core and one to the cover. The strip fastened to the core is disposed at the base (7) of a channel (8) in the core (2). The depth of the channel (8) is greater than the sum of the thicknesses of both strips (3, 5). The strip (3, 5) fastened to the cover (1) is attached to a distance element (10), which is in turn fastened to the cover (1).

19 Claims, 1 Drawing Sheet

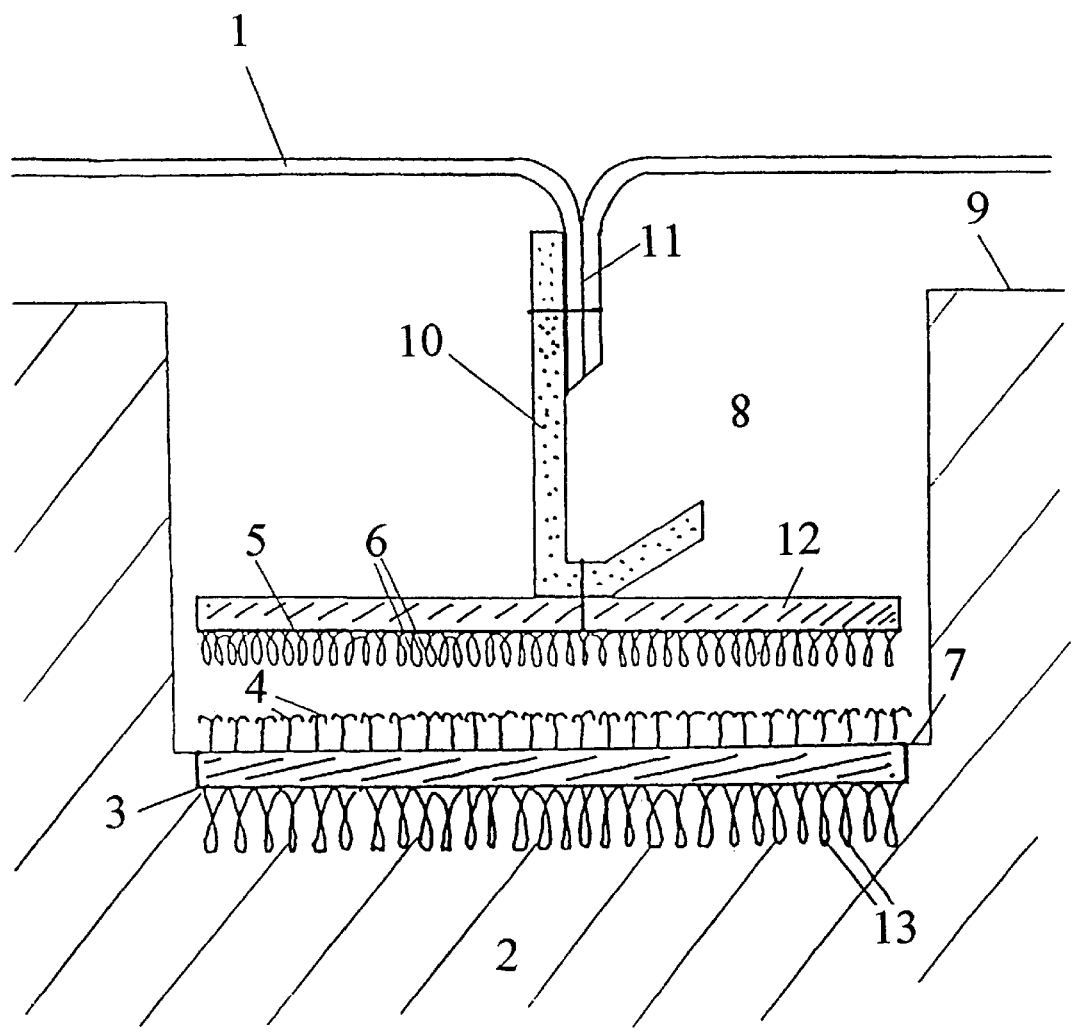

UPHOLSTERED ELEMENT FASTENED TO A COVER BY MEANS OF A HOOK AND LOOP STRIP

FIELD OF THE INVENTION

The invention relates to an upholstery element having a flexible core and a cover, which are fastened to one another by a hook-fastener connection comprising a hook strip having a plurality of hooks overlaid by a fleece strip having a plurality of elements, behind which the hooks engage, the strips being fastened one to the core and one to the cover.

BACKGROUND OF THE INVENTION

The covers of upholstery elements, e.g. the seats of a motor vehicle, are frequently fastened by means of hook-fastener connections which enable simple and rapid fitting as well as removal of the covers for exchange or cleaning purposes. The hook-fastener connection comprises two cooperating strips, of which one is provided with a plurality of hooks, which may be, for example, single hooks, multiple hooks or profile- or mushroom-shaped elements for rear engagement. The hooks engage into mostly loop-like elements of the second strip, which is referred to as the fleece strip. By virtue of a uniform distribution of hooks and the elements cooperating therewith on the strip surfaces, mutual fixing in any desired position relative to one another is possible. Since, as a rule, both the hooks and the loops are made of a flexible material, the connection is releasable by exerting an adequate tensile force, under which hooks and/or elements elastically deform and slide out of one another.

Frequently the strip, which is fastened to the core of the upholstery element and is generally the hook strip, is disposed in a shallow trough. Its projection beyond the surrounding surface of the core is thereby prevented so that a bulging of the cover situated on top and an intrusive raising of the upholstery surface is avoided. The strip fastened to the core is generally provided at the rear with a fibrous web which is incorporated into the foam material of the core.

By virtue of its construction, during a deformation of the hook-fastener connection several hooks as a rule disengage from the loops, with there being, upon termination of the load, mostly a renewed engagement into the same or other loops. If, however, the hook-fastener connection is subjected to a high number of load changes, as is the case particularly when it is fitted on or in the edge region of a seat surface, there is a risk that it will, given time, open independently or that the position of the strips relative to one another will alter. There is moreover in this manner an increased wear of hooks and loops leading to a reduction in the stability under load. Thus, with conventional hook-fastener connections it is impossible to achieve the tear-out resistances which are possible with other methods of fastening the cover, such as a fixing to wire inserts which are incorporated into the foam material of the core. This applies particularly when the fleece strip, as is customary in prior art, is sewn in a U-shape around a seam of the cover so that only a narrow end face of this strip is in contact with the hook strip.

SUMMARY AND OBJECTS OF THE INVENTION

It is an object of the invention to develop an upholstery element having a hook-fastener connection which presents an increased stability under load.

According to the invention a strip fastened to the core is disposed at the base of a channel in the core, the depth of the channel is greater than the sum of the thicknesses of both strips and the strip fastened to the cover is attached to a distance element, which is in turn fastened to the cover.

The invention proceeds from the idea that, upon a loading of the upholstery element, different regions of its core experience differing degrees of deformation. Whereas the surface under each load considerably deforms and adapts to the shape of articles lying against it, underlying regions of the core alter their shape to a far lesser extent. Often they deform only under extreme loads, such as when a person lowers himself into a seat.

The invention therefore proposes that the hook-fastener connection be disposed at a distance from the surface of the core. To this end, the core has in its surface a channel, to the base of which one of the strips of the hook-fastener connection is fastened. The depth of the channel is greater than the thickness of both strips when fastened to one another so that the hook-fastener connection is always at a distance from the surface of the core and hence from the cover. The effect thereby achieved is that the hook-fastener connection under smaller loads, such as when a person alters his seating position on the upholstery element, is subject to no or substantially reduced deformation. The sliding of individual hooks out of the elements of the fleece strip cooperating therewith is accordingly avoided. The attachment of the second strip of the hook-fastener connection to the cover is effected by means of a distance element fastened to both in order to enable an extensively smooth surface of the cover.

The advantage of the upholstery element according to the invention lies in an increased stability under load of the hook-fastener connection which, even given long-term use of the upholstery element, is maintained virtually unaltered. A contributory factor is that a displacement of both strips of the hook-fastener connection relative to one another and hence displacements of the cover parallel to the surface of the upholstery element are ruled out because the position of the strips is defined by the side walls of the channel. To this end, the lateral boundaries of the channel preferably extend approximately at right angles to the plane of the strips or the channel widens in its cross section at the base. In this manner, the precise arrangement of the cover on the core is moreover ensured so that the manufacture of the upholstery element is substantially simplified and is also possible in a precise manner without a tool, especially when the surfaces of both strips have identical dimensions.

In order to achieve a sufficient distance of the hook-fastener connection from the surface of the upholstery element, the depth of the channel is advantageously at least a quarter of the thickness of the core or of the upholstery element. Also conceivable, however, are much greater channel depths, with the channel in extreme cases penetrating the entire core. In this case, the attachment of one strip of the hook-fastener connection to a frame supporting the core is possible.

In the simplest case, the distance element between cover and hook-fastener connection is a fold introduced, e.g. sewn, into the cover. Preferably, however, the distance element is a fabric strip or hooks, which are advantageously sewn onto the cover as well as onto the strip of the hook-fastener connection. Instead of individual hooks, a continuous profile is conceivable as a distance element, which may be manufactured in an advantageous manner by extrusion.

The core is preferably made of a foam material, with polyurethanes in particular having proved successful as an upholstery material. In such a case, it is advantageous when the strip fastened to the core is provided at the rear with threads which protrude from its surface and are incorporated into the foam material of the core. The resultant effect for a low outlay is an intensive connection, particularly when the threads are formed into loops, which are fastened at both ends to the strip and form a positive engagement connection to the material of the core. It is advantageous when a large number of threads are uniformly distributed over the strip and engage deep into the foam, resulting in a connection which is extremely stable under load.

Particularly suitable as threads for anchoring the strip are threads made of natural fibers which, by virtue of their surface structure and capillary indentations, enter into an intensive positive engagement connection with the surrounding foam material. An additional factor is chemical bonding between the foam material and the threads, especially when hydroxyl groups on the surface of the fibers during the expansion process for manufacturing the core react with the isocyanate groups of a polyurethane. Furthermore, chemical bonds between the threads and the foam material may be produced or strengthened by providing the surface of the threads with an adhesive agent. Finally, vegetable fibers have proved advantageous in terms of waste disposal of the upholstery element.

The fitting of the hook-fastener connection at a distance from the surface opens up the possibility of providing the strip fastened to the cover with a stiffening device which is not perceptible from the outside of the upholstery element. The stiffening device is preferably a plate made of rigid material, e.g. a plastic material, or of a viscoplastic material such as hard rubber. The stiffening device is attached to the surface of the strip of the hook-fastener connection or inserted into the strip and offers considerable advantages. On the one hand, the fastening of both strips of the hook-fastener connection to one another is made much simpler because only a point support of the stiffened strip is necessary when it is pressed onto the other strip. Thus, assembly is speeded up compared to a flexible strip which, under the overlying cover, requires contact pressure over its entire length. In particular, however, the stiffening device effects a large-area distribution of forces over the entire surface of the hook-fastener connection. The force required to open said connection consequently increases considerably. In particular, an opening of sections of the hook-fastener connection by a locally limited tensile load is prevented. The resultant effect is a fastening of the cover which has a stability under load comparable to or even greater than a conventional anchoring using wires. The upholstery appearance produced by the fastening to the stiffened hook-fastener connection advantageously matches that of conventional anchoring using wires.

The width and length of the strip fastened to the core are advantageously identical to the dimensions of the channel base. The resultant effect is a maximum surface area and hence stability under load of the hook-fastener connection combined with minimal dimensions of the channel. Conversely, a lateral projection of the strip beyond the channel base, i.e. incorporation of the edges of the strip into the foam material, proves disadvantageous because in said case occlusions in the foam material may arise and frequently the sealing of the form tool proves problematical.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

In the drawing:

The only FIGURE is a schematic cross sectional representation through an upholstery element according to the invention with a hook-fastener connection.

DESCRIPTION OF THE PREFERRED EMBODIMENT

Referring to the drawing in particular, a hook-fastener connection is shown in the open state in cross section perpendicular to the longitudinal axis of the strips forming the connection. The hook-fastener connection is used to fasten the cover 1 of an upholstery element to the latter's core 2, which is made of a foam material. A hook strip 3 is provided with a surface having a plurality of flexible double hooks 4. The hook-fastener connection is formed by the flexible double hooks 4 of the hook strip 3 engaging into loops 6 provided on the surface of a fleece strip 5, which is provided at the top. The fleece strip 5 is fastened to the cover 1. This produces a connection which is stable under tensile load. The arrangement of the hook strip 3 is effected on the base 7 of a channel 8 in the core 2. The hook strip is consequently at a distance from the outer surface 9 of the core 2 and from the cover 1. Accordingly, there is provided for the connection between the cover 1 and the fleece strip 5 a profile-shaped distance element 10 which is connected to, e.g. sewn onto, both, the connection to the cover 1 preferably being effected at one of its seams 11.

In order to increase the stability under load of the hook-fastener connection and simplify its assembly, the fleece strip 5 is attached to a plate 12 made of rigid material so that closure of the connection may be effected in a single action by applying contact pressure. Similarly it is conceivable also to stiffen the hook strip 3 by means of a plate. The considerable advantage of stiffening lies in the fact that local dynamic effects upon the fleece strip 5 are distributed over the hook-fastener connection. A considerably increased stability under load of the connection is the advantageous result. And the effect of the arrangement of the plate 12 at a distance from the cover 1 is that the plate is not perceptible from the outside of the upholstery element and therefore does not impair its comfort.

To ensure an adequate adhesion of the hook strip 3 to the core 2, the former is provided at the rear with threads 13, which are preferably loops of natural fibers. In said manner, the deep engagement into the foam material as well as the penetration of the foam material into capillaries in and between the fibers of the threads 13 produce an intensive positive engagement connection to the core 2, which is preferably strengthened by chemical bonds between both and enables the take-up of high loads. The end result is an upholstery element having a cover fastened by means of a hook-fastener connection, which is easy to establish and presents a stability under load which is substantially increased.

While a specific embodiment of the invention has been shown and described in detail to illustrate the application of the principles of the invention, it will be understood that the invention may be embodied otherwise without departing from such principles.

What is claimed is:

1. An upholstery element with a flexible core, a cover and a hook-fastener connection for fastening the cover to the core, the connection comprising:

a hook strip having a plurality of hooks overlaid by a fleece strip having a plurality of elements, behind which the hooks engage, the strips being fastened one to the core and one to the cover, the strip fastened to the core being disposed at the base of a channel in the core, the depth of the channel being greater than the sum of the thicknesses of both strips and the strip fastened to the cover being attached to a spacer element, which spacer element is in turn fastened to the cover, said strip fastened to the cover being attached to a stiffening device.

2. The upholstery element according to claim 1, wherein the depth of the channel is at least a quarter of the thickness of the core.

3. The upholstery element according to claim 1, wherein the spacer element is a hook or a fabric strip.

4. The upholstery element according to claim 1, wherein the core is made of a foam material.

5. The upholstery element according to claim 4, wherein the strip is fastened to the core and is provided with threads, which are embedded into the foam material of the core.

6. The upholstery element according to claim 5, wherein the threads are formed into loops.

7. The upholstery element according to claim 5, wherein the threads are made of natural fibers.

8. The upholstery element according to claim 5, wherein the threads are provided with an adhesive agent.

9. The upholstery element according to claim 1, wherein said stiffening device is a plate.

10. The upholstery element according to claim 9, wherein said plate is made of rigid or viscoplastic material.

11. The upholstery element according to claim 1, wherein a width and a length of the strip fastened to the core are equal to a width and a length of the base of the channel.

12. An upholstery element, comprising:
   a flexible core having a channel with a base, said channel having a depth;
   a cover with a spacer element fastened thereto;
   a hook-fastener connection for fastening said cover to said core, said connection including
      a hook strip having a plurality of hooks; and
      a fleece strip having a plurality of elements, one of said hook strip and said fleece strip forming a core strip fastened to said core and one of said hook strip and said fleece strip forming a cover strip fastened to said cover, said core strip being disposed at a base of said channel, said depth of said channel being greater than a sum of thicknesses of said hook strip and said fleece strip, said cover strip being attached to said spacer element and said cover strip being attached to a stiffening device wherein said hook strip is overlaid by said fleece strip, behind which said hooks engage.

13. The upholstery element according to claim 12, wherein said depth of said channel is at least a quarter of a thickness of said core.

14. The upholstery element according to claim 12, wherein said spacer element is a hook or a fabric strip.

15. The upholstery element according to claim 12, wherein said core is made of a foam material, wherein said core strip is provided with threads, which are thickness into said foam material of said core.

16. The upholstery element according to claim 15, wherein said threads are formed into loops.

17. The upholstery element according to claim 15, wherein said threads are provided with an adhesive agent.

18. The upholstery element according to claim 12, wherein said strip fastened to said cover is attached to a plate forming a stiffening device of rigid or viscoplastic material.

19. The upholstery element according to claim 12, wherein a width and a length of said strip fastened to said core are equal to a width and a length of said base of said channel.

* * * * *

UNITED STATES PATENT AND TRADEMARK OFFICE
CERTIFICATE OF CORRECTION

PATENT NO. : 6,206,467 B1
DATED : March 27, 2001
INVENTOR(S) : Mense et al

It is certified that error appears in the above-identified patent and that said Letters Patent is hereby corrected as shown below:

<u>Title page,</u>
Item [75] Inventors: Hubert Mense, Augsburg;
                         Charlotte Leckert, Wuzburg, both of (DE)

Signed and Sealed this

Twenty-eighth Day of August, 2001

*Attest:*

NICHOLAS P. GODICI
*Attesting Officer    Acting Director of the United States Patent and Trademark Office*